(12) United States Patent
Oberhauser et al.

(10) Patent No.: US 11,226,661 B2
(45) Date of Patent: *Jan. 18, 2022

(54) SECURING A TOUCH SENSOR ASSEMBLY WITHIN A DEVICE

(71) Applicant: TEXAS INSTRUMENTS INCORPORATED, Dallas, TX (US)

(72) Inventors: Christopher Alan Oberhauser, San Jose, CA (US); Evgeny Fomin, San Carlos, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/630,945

(22) Filed: Jun. 22, 2017

(65) Prior Publication Data

US 2017/0371380 A1 Dec. 28, 2017

Related U.S. Application Data

(60) Provisional application No. 62/353,126, filed on Jun. 22, 2016.

(51) Int. Cl.
| | |
|---|---|
| *G06F 1/16* | (2006.01) |
| *G06F 3/046* | (2006.01) |
| *G06F 3/044* | (2006.01) |
| *G06F 3/041* | (2006.01) |

(52) U.S. Cl.
CPC ............ *G06F 1/1692* (2013.01); *G06F 3/041* (2013.01); *G06F 3/046* (2013.01)

(58) Field of Classification Search
None
See application file for complete search history.

(56) References Cited

U.S. PATENT DOCUMENTS

| | | | | |
|---|---|---|---|---|
| 2007/0102270 | A1* | 5/2007 | Takashima | H04R 11/02 200/83 R |
| 2015/0022960 | A1* | 1/2015 | Doi | G06F 1/1616 361/679.08 |
| 2015/0103478 | A1* | 4/2015 | Lee | G06F 1/1656 361/679.26 |
| 2015/0373441 | A1* | 12/2015 | Behles | H01L 41/0973 381/333 |

(Continued)

*Primary Examiner* — Benjamin C Lee
*Assistant Examiner* — Emily J Frank
(74) *Attorney, Agent, or Firm* — Ray A. King; Charles A. Brill; Frank D. Cimino

(57) ABSTRACT

An arrangement for securing a touch sensor assembly within a mobile communication or other device with at least one touch button defined within a touch button area. The touch sensor assembly includes a touch sensor (such as a sense inductor coil), and multiple back-side spring clips attached at the back-side of the sensor assembly. A touch sensor pocket integral with the device case is disposed at an interior-side of the touch button area, the sensor pocket to position the sensor assembly relative to the associated touch button. The touch sensor assembly can be secured within the touch sensor pocket by the back-side spring clips, spring-urged toward the front-side of the sensor pocket, and spaced from the device case by spacer elements (which can be attached to the sensor assembly, or integrated into the device case). The touch sensor pocket can include back-side alignment elements for aligning the spring clips.

10 Claims, 4 Drawing Sheets

(56) References Cited

U.S. PATENT DOCUMENTS

| | | | |
|---|---|---|---|
| 2016/0231837 A1* | 8/2016 | Baek | G09G 3/3225 |
| 2017/0026498 A1* | 1/2017 | Goldfain | A45C 11/182 |
| 2017/0285848 A1* | 10/2017 | Rosenberg | G06F 3/03547 |
| 2018/0203539 A1* | 7/2018 | Huang | G06F 3/0447 |
| 2020/0387279 A1* | 12/2020 | Kim | G06F 3/04845 |

* cited by examiner

SECURING A TOUCH SENSOR ASSEMBLY WITHIN A DEVICE

CROSS-REFERENCE TO RELATED APPLICATIONS

Priority is claimed under 37 CFR 1.78 and 35 USC 119(e) to U.S. Provisional Application 62/353,126, filed 22 Jun. 2016), incorporated by reference.

BACKGROUND

Technical Field

This Provisional Patent Disclosure relates to touch input, such as touch buttons or keys, such as for use in personal computing/communication devices.

Related Art

Mobile/portable personal communications/computing devices commonly include physical/mechanical buttons integrated into a device case (such as on a side-wall edge). Such mechanical touch buttons are distinguished from, for example, capacitive touch buttons defined on a device screen.

Touch sensing technology can be used to replace these physical/mechanical buttons. Touch sensing can be used to detect touch-press of a touch button defined on a touch button surface, such as based on touch surface deflection/deformation. Touch sensing can be based on inductive sensing with an inductor coil sensor, or capacitive sensing with a capacitive electrode, disposed within the device case at the back-side of the touch button surface.

While this Background information references touch input for mobile/personal communication/computing devices, this Patent Disclosure is more generally directed to input button/keys based on touch technology.

BRIEF SUMMARY

This Brief Summary is provided as a general introduction to the Disclosure provided by the Detailed Description and Drawings, summarizing aspects and features of the Disclosure. It is not a complete overview of the Disclosure, and should not be interpreted as identifying key elements or features of, or otherwise characterizing or delimiting the scope of, the disclosed invention.

The Disclosure describes apparatus and methods for securing a touch sensor assembly within a device case, such as can be used to implement touch buttons in a mobile or personal computing device.

According to aspects of the Disclosure, an apparatus for securing a touch sensor assembly can be used in a device with at least one touch button defined on a touch button area of the device. The apparatus can include a touch sensor assembly having a front-side and a back-side, and including: a touch sensor; and multiple back-side spring clips attached at the back-side of the touch sensor assembly. The apparatus can include a touch sensor pocket integral with the device case at an interior-side of the touch button area, the interior-side of the touch button area forming a front-side of the touch sensor pocket—the touch sensor pocket to position the touch sensor assembly relative to the associated touch button. The touch sensor assembly can be secured within the touch sensor pocket by the back-side spring clips, spring-urged toward the front-side of the touch sensor pocket, and spaced from the device case by multiple spacer elements.

In other aspects of the Disclosure, an apparatus for securing a touch sensor assembly according to this Disclosure can be used in a device with at least one touch button defined on a touch button area of the device, the device including a touch sensor pocket integral with the device case at an interior-side of the touch button area. The apparatus can include a touch sensor assembly having a front-side and a back-side, and including a touch sensor, and multiple back-side spring clips attached at the back-side of the touch sensor assembly. The touch sensor assembly can be positioned and secured within the touch sensor pocket, with the back-side spring clips used to secure the touch sensor assembly within the touch sensor pocket by spring-urging the touch sensor assembly toward the front-side of the touch sensor pocket, spaced from the device case by spacer elements.

In other aspects of the Disclosure, a device can include a device case with at least one touch button defined on a touch button area of the device case. The device can include a touch sensor assembly having a front-side and a back-side, and including a touch sensor, and multiple back-side spring clips attached at the back-side of the touch sensor assembly. To position the touch sensor assembly relative to the associated touch button, the device can include a touch sensor pocket integral with the device case at an interior-side of the touch button area, which forms a front-side of the touch sensor pocket, the touch sensor pocket. The touch sensor assembly can be secured within the touch sensor pocket by the back-side spring clips, spring-urged toward the front-side of the touch sensor pocket, and spaced from the device case by spacer elements.

Other aspects and features of the invention claimed in this Patent Document will be apparent to those skilled in the art from the following Disclosure.

[25A, 25B] according to this Disclosure, with dual touch sensor assemblies secured with respective back-side spring clips [210AA, 210AB, and 210BA, 210BB], the example dual touch sensor assembly including dual sensors [201A, 201B] (such as sense inductor coils) on a single pcb with respective stiffeners [203A, 203B], and secured within the dual touch sensor pocket with respective sensor back-side spring clips [210AA, 210AB, and 210BA, 210BB] attached to the respective stiffeners, and respective front-side spacers [201AA, 205AB, and 205BA, 205BB] attached to the sensor front-side, maintaining a sensing gap/spacing [29A, 29B] to permit touch deflection of the respective touch button.

Figure 5:
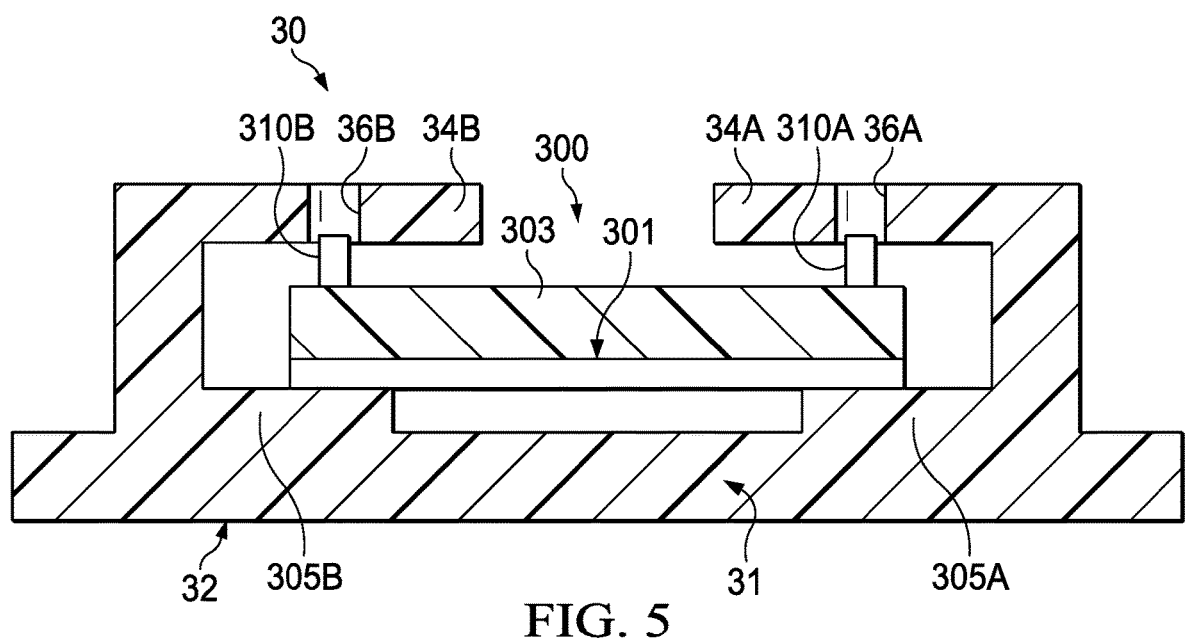

FIG. 5 illustrates an alternate example implementation of an apparatus [30] for securing a touch sensor assembly [300] within a touch sensor pocket [35] integral with a device case [32], according to this Disclosure, the touch sensor pocket including spacer shoulders [305A, 305B] integral with the device case at the edges of the touch button area, maintaining a sensing gap/spacing [39] while avoiding the need to attach spacers to the front-side of the touch sensor assembly.

DETAILED DESCRIPTION

This Description and the Drawings constitute a Disclosure for apparatus and methods for securing a touch sensor assembly within a device, including describing example embodiments, and illustrating various technical features and advantages.

Examples of apparatus for securing a touch sensor assembly within a device case are described in the context of an example application of a mobile device, in which one or more single or dual touch buttons are implemented a mobile device, such as on an edge panel of the device case.

In brief overview, an arrangement for securing a touch sensor assembly within a mobile communication or other device with at least one touch button defined within a touch button area. The touch sensor assembly includes a touch sensor (such as a sense inductor coil), and multiple back-side spring clips attached at the back-side of the sensor assembly. A touch sensor pocket integral with the device case is disposed at an interior-side of the touch button area, the sensor pocket to position the sensor assembly relative to the associated touch button. The touch sensor assembly can be secured within the touch sensor pocket by the back-side spring clips, spring-urged toward the front-side of the sensor pocket, and spaced from the device case by spacer elements (which can be attached to the sensor assembly, or integrated into the device case). The touch sensor pocket can include back-side alignment elements for aligning the spring clips.

Figure 1A:
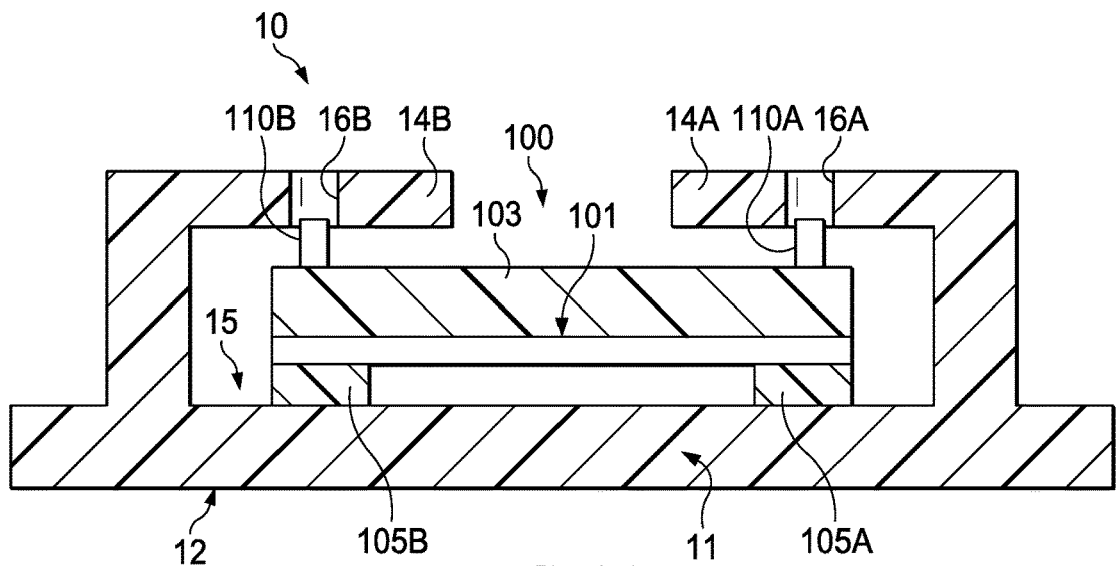
FIGS. 1A-1C illustrate respective views of an example arrangement [10] for securing a touch sensor assembly [100] within a device including at least one touch button [11], the touch sensor assembly [100] positioned within a touch sensor pocket [15] (integral with the device case [12] at the touch button area [11]), the touch sensor assembly includes a touch sensor [101] (such as a sense inductor coil) with a back-side stiffener [103], and is secured within the touch sensor pocket by back-side spring clips [110A, 110B], positioned at alignment points (holes) [16A, 16B] at respective edges of the touch sensor assembly, with a sensing gap/spacing [19] maintained by front-side edge spacers [105A, 105B], to permit touch deflection of the touch button area [11] of the case [12] toward the touch sensor [101].
Figure 1B:
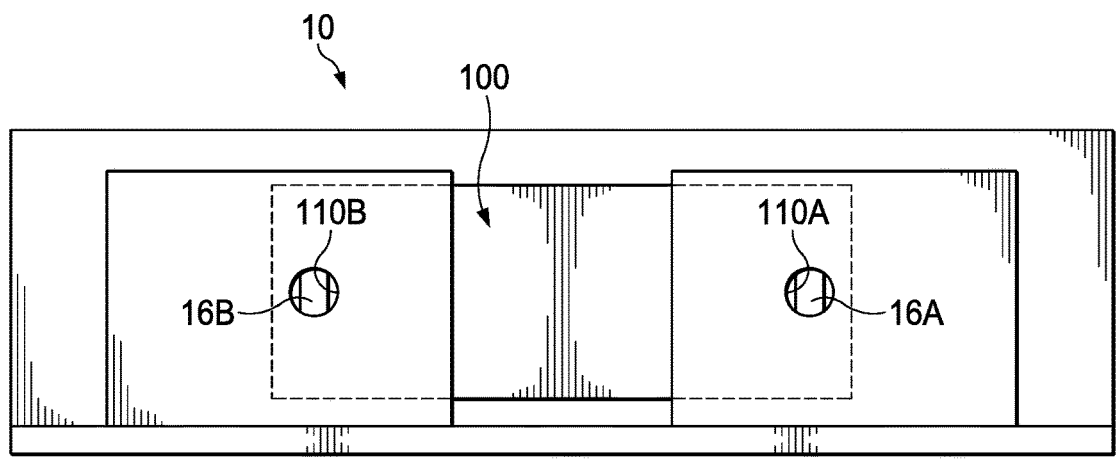
Figure 1C:
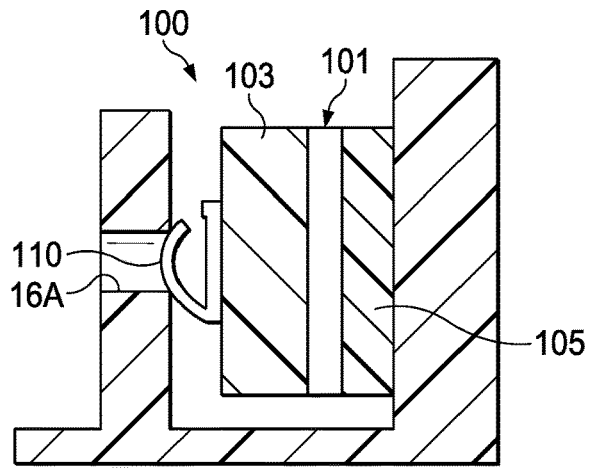

FIGS. 1A-1C illustrate respective views of an example arrangement for securing a touch sensor assembly within a device including at least one touch button, the touch sensor assembly positioned within a touch sensor pocket (integral with the device case at the touch button area), the touch sensor assembly includes a touch sensor (such as a sense inductor coil) with a back-side stiffener, and is secured within the touch sensor pocket by back-side spring clips, positioned at alignment points (holes) at respective edges of the touch sensor assembly, with a sensing gap/spacing maintained by front-side edge spacers, to permit touch deflection of the touch button area of the device case toward the touch sensor.

Figure 2A:
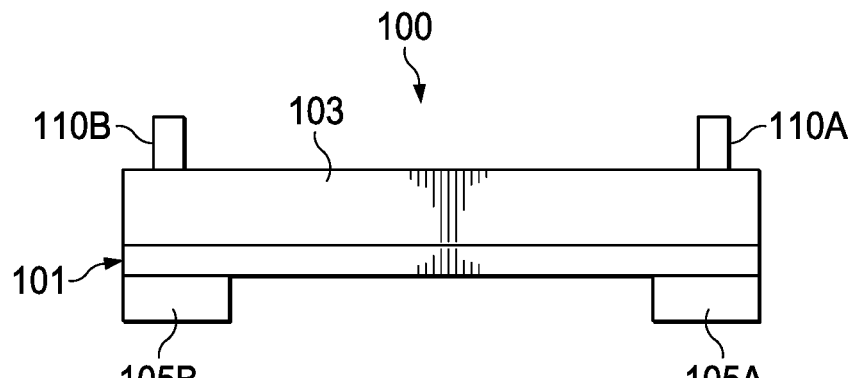
FIGS. 2A-2C illustrate respective views of the example touch sensor assembly [100] of FIGS. 1A-1C, including a touch sensor [101] (such as a sense inductor coil) with a back-side stiffener [103], and two back-side spring clips [110A, 110B] at respective back-side edges of the touch sensor assembly, and including in this example front-side spacers [105A, 105B] at respective front-side edges of the touch sensor.
Figure 2B:
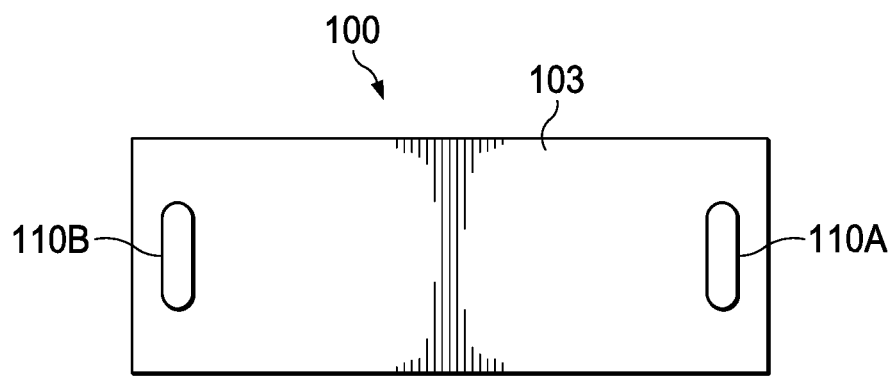
Figure 2C:
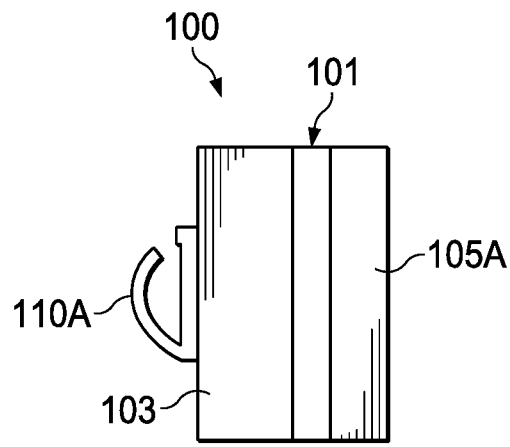

FIGS. 2A-2C illustrate respective views of the example touch sensor assembly of FIGS. 1A-1C, including a touch sensor (such as a sense inductor coil) with a back-side stiffener, and two back-side spring clips at respective back-side edges of the touch sensor assembly, and including in this example front-side spacers at respective front-side edges of the touch sensor.

Figure 3B:
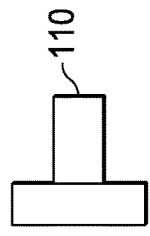
FIG. 3A-3B illustrate respective views of an example spring clip [110] used to secure the touch sensor assembly of FIGS. 1A-1C and FIGS. 2A-2C.
Figure 3A:
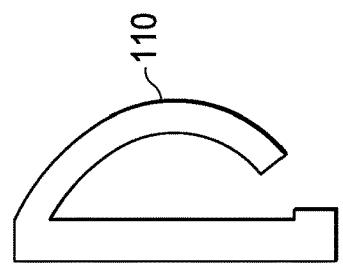

FIG. 3A-3B illustrate respective views of an example spring clip used to secure the touch sensor assembly of FIGS. 1A-1C and FIGS. 2A-2C.

Figure 4:
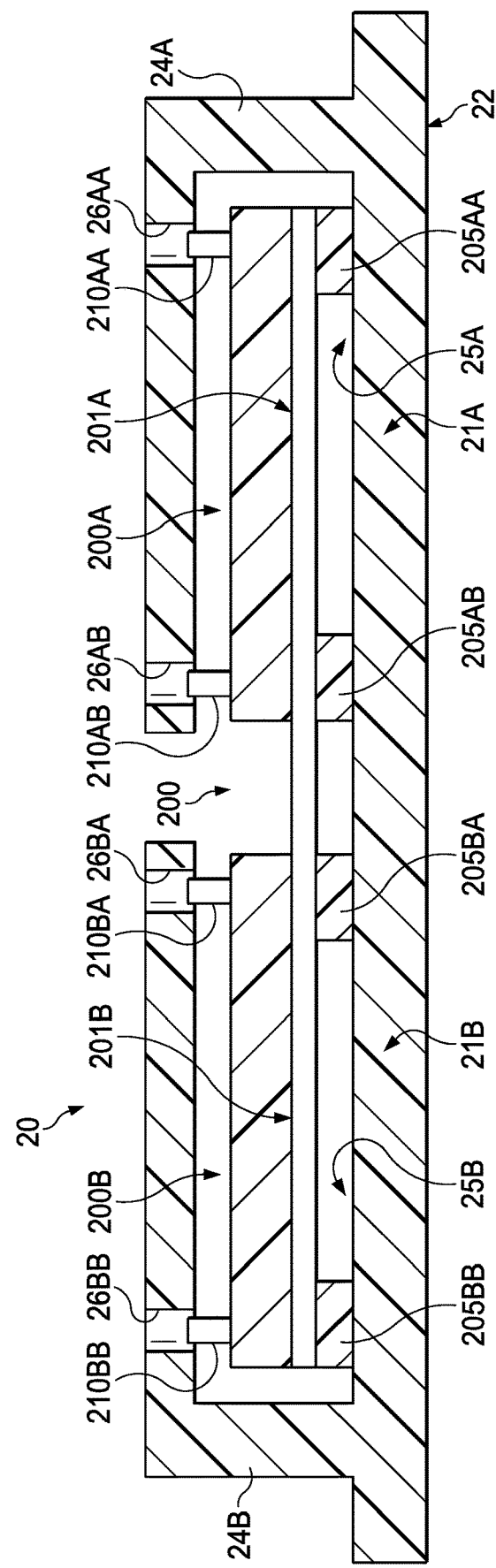
FIG. 4 illustrates an example dual touch button arrangement [20] in which a dual touch sensor assembly [200, 200A, 200B] is secured within a dual touch sensor pocket

FIG. 4 illustrates an example dual touch button arrangement in which a dual touch sensor assembly is secured within a dual touch sensor pocket according to this Disclosure, with dual touch sensor assemblies secured with respective back-side spring clips, the example dual touch sensor assembly including dual sensors (such as sense inductor coils) on a single pcb with respective stiffeners, and secured within the dual touch sensor pocket with respective sensor back-side spring clips attached to the respective stiffeners, and respective front-side spacers attached to the sensor front-side, maintaining a sensing gap/spacing to permit touch deflection of the respective touch button.

FIG. 5 illustrates an alternate example implementation of an apparatus for securing a touch sensor assembly within a device case, according to this Disclosure, the touch sensor pocket including spacer shoulders integral with the device case at the edges of the touch button area, avoiding the need to attach spacers to the front-side of the touch sensor assembly.

Touch sensing can be based on any sensing technology capable of detecting deformation of the touch button for the particular application and device design. Examples are inductive and capacitive sensing technologies, using respective touch sensor configurations and electronics. Implementations of touch deformation sensing technology are not part of this Disclosure, and are not described in detail. For example, inductive sensing can be based on detecting button-press deformation of a touch button area, configured as a conductive target, toward a spaced sensor coil inductor, causing a change in coil inductance (i.e., a change in the projected magnetic field of the coil inductor driven by the sensor electronics). And, capacitive sensing can be based on detecting button-press deformation of a touch button area toward a capacitive electrode, causing a change in projected electric field detected as a change in capacitance.

For an example implementation based on inductive sensing, the sensor electronics can be designed to provide excitation current drive to the sensor inductor coil (creating a projected time varying magnetic sensing field), and to measure a sensor inductor coil characteristic (such as inductance or Q-factor) indicative of the position of the touch button area (conductive target) relative to the sensor inductor coil, including deflection of the touch button area toward the sensor inductor coil in response to a touch button-press condition.

In summary, when the touch button apparatus is assembled, the touch sensor assembly is inserted within the touch sensor pocket/receptacle, and secured by the sensor back-side spring clips in position relative to the touch button area for touch sensing, with the sensor back-side spring clips exerting a force on the back of the touch sensor assembly, pressing it against the internal wall of the touch button area (which forms a front-side of the touch sensor pocket), with a touch sensing gap/spacing maintained, for example, by front-side spacers (such as illustrated in FIGS. 1A-1C, 2A-2C, 4), or by spacer shoulders at the edges of the touch button area of the case (such as illustrated in FIG. 5).

The Disclosure provided by this Description and the Figures sets forth example embodiments and applications illustrating aspects and features of the invention, and does not limit the scope of the invention, which is defined by the claims. Known circuits, connections, functions and operations are not described in detail to avoid obscuring the principles and features of the invention. These example embodiments and applications, can be used by ordinarily skilled artisans as a basis for modifications, substitutions and alternatives to construct other embodiments, including adaptations for other applications.

The invention claimed is:

1. An apparatus for use in a device having a case and having at least one touch button defined on a touch button area of the device, the apparatus comprising:
   a spacer having a first spacer surface and a second spacer surface, the first spacer surface adapted to be directly coupled to a first case surface, and the second spacer surface is opposite the first spacer surface;
   a touch sensor having a first sensor surface and a second sensor surface, the first sensor surface directly coupled to the second spacer surface, and the second sensor surface is opposite the first sensor surface, wherein the spacer maintains a gap between the first sensor surface and the first case surface;
   a stiffener having a first stiffener surface and a second stiffener surface, the first stiffener surface directly coupled to the second sensor surface, and the second stiffener surface is opposite the first stiffener surface;
   a spring clip having a first clip surface and a second clip surface, the first clip surface directly coupled to the second stiffener surface, the second clip surface adapted to be coupled to a second case surface, the second case surface being opposite the first case surface;
   wherein the spring clip exerts a force on the stiffener, and the stiffener exerts a force on the touch sensor, pressing the touch sensor against the spacer; and
   wherein, the gap decreases in response to a deflection of the device case.

2. The apparatus of claim 1, wherein the spacer is from the group consisting of:
   spacer elements attached at respective edges of the front-side of the touch sensor assembly; and
   spacer shoulders integral with the device case, at respective edges of the touch sensor pocket.

3. The apparatus of claim 1, wherein the device includes a dual touch button area having first and second touch buttons, and first and second touch sensors aligned with the respective first and second touch buttons.

4. The apparatus of claim 1, wherein the touch sensor includes a sense inductor coil.

5. The apparatus of claim 1, wherein the device is a mobile communication device, and the at least one touch button is defined on a side-wall of the device.

6. An apparatus for use in a device with at least one touch button defined on a touch button area of the device, the apparatus comprising:
   a device case having a first case surface and a second case surface;
   a touch sensor pocket integral with the device case at an interior side of the touch button area;
   a spacer having a first spacer surface and a second spacer surface, the first spacer surface adapted to be directly coupled to the first case surface, and the second spacer surface is opposite the first spacer surface;
   a touch sensor having a first sensor surface and a second sensor surface, the first sensor surface directly coupled to the second spacer surface, and the second sensor surface opposite the first sensor surface, wherein the spacer provides a gap between the first sensor surface and the first case surface;
   a stiffener having a first stiffener surface and a second stiffener surface, the first stiffener surface directly coupled to the second sensor surface, and the second stiffener surface is opposite the first stiffener surface;
   a spring clip having a first clip surface and a second clip surface, the first clip surface directly coupled to the second stiffener surface, and the second clip surface adapted to be coupled to the second case surface with an alignment element, and the second clip surface positioned at an alignment point;
   wherein the spring clip exerts a force on the stiffener, and the stiffener exerts a force on the touch sensor, pressing the touch sensor against the spacer; and
   wherein, the gap decreases in response to a deflection of the device case.

7. The apparatus of claim 6, wherein the spacer is from the group consisting of:
   spacer elements attached at respective edges of the front-side of the touch sensor assembly; and
   spacer shoulders integral with the device case, at respective edges of the touch sensor pocket.

8. The apparatus of claim 6, wherein the device includes a dual touch button area having first and second touch buttons, and wherein the touch sensor pocket is a dual touch sensor pocket, and first and second touch sensors are aligned with the respective first and second touch buttons.

9. The apparatus of claim 6, wherein the touch sensor includes a sense inductor coil.

10. The apparatus of claim 6, wherein the device is a mobile communication device, and the at least one touch button is defined on a side-wall of the device.

* * * * *